Patented Nov. 23, 1937

2,100,010

UNITED STATES PATENT OFFICE 2,100,010

MANUFACTURE OF NEW CELLULOSE COMPOUNDS AND OF ARTIFICIAL MATERIALS THEREOF

Leon Lilienfeld, Vienna, Austria

No Drawing. Application June 22, 1932, Serial No. 618,802. In Great Britain July 4, 1931

22 Claims. (Cl. 18—54)

This invention is a further development of my investigations on the production of artificial structures (including artificial threads etc.).

My further research work on the process has revealed the fact that technically valuable products are formed:

(1) When alkali cellulose is treated with one or more of the reagents which belong to the types proposed in my U. S. patent application Ser. No. 618,801 (now Patent No. 2,051,051) for being contacted with cellulose xanthate (viscose) and (2) When the xanthates thus obtained are, in absence or presence of cellulose xanthate, converted into artificial structures.

The materials described in Ser. No. 618,801, for acting upon cellulose xanthate (viscose) are derivatives of polyhydric alcohols, which derivatives contain:—

(a) At least one nitrogen atom attached to a carbon atom, (this nitrogen being preferably in an amino group)

(b) At least one oxygen atom attached to a carbon atom, (this oxygen being preferably in an OH group)

(c) At least one acid residue (preferably a halogen atom) attached to a carbon atom, and of these three substituents, not more than two are attached to the same carbon atom, and preferably the three substituents are attached to three different carbon atoms of the polyvalent organic nucleus.

Such bodies can be prepared by reacting upon a dichlorhydrine (e. g. dichlorhydrine of glycerine) with ammonia preferably at well below 100° C., e. g. at about room temperature.

The following typical example of the preparation of such a body is quoted from Ser. No. 618,800:

Example A 1185 parts of a solution of ammonia in absolute alcohol (produced by introduction of 240 parts of dry ammonia gas into 1000 parts of absolute alcohol at 0° C.) are added to 1000 parts of α-dichlorohydrine and the mixture is kept, with intermittent shaking, in a well closed vessel at 16 to 18° C. for 10 days. After that time, the clear alcoholic mother liquor is separated from the crystals of the ammonium chloride by filtration, the ammonium chloride crystals are washed with absolute alcohol and the clear alcoholic filtrate, together with the washing alcohol, is freed from alcohol and ammonia by distillation under reduced pressure at 30 to 35° C.

The residue is a clear, yellow, very viscous oil, soluble in water and alcohol, but insoluble in ether.

If desired, the product of the reaction may be purified by one of the following methods:

First method

The crude product of the reaction, that is the residue of the distillation of the alcohol and ammonia, is freed from the α-dichlorohydrine (if any) by distilling off the dichlorohydrine under reduced pressure (15 to 18 mm.) at 70 to 80° C.

The body being rather sensitive to the action of heat, the temperature of 70 to 80° C. should not be exceeded.

The residue of the distillation is a perfectly clear, yellow, very thick syrup, the consistence of which is similar to that of a very thick honey or Venice turpentine.

Second method

The crude reaction mass, that is, the residue of the distillation of the alcohol and ammonia, is kneaded with repeatedly changed quantities of ether until, on evaporation, the ether (after such use) does not leave any residue, whereupon the product is dried at reduced pressure at room temperature.

The final product is an almost clear yellow syrup, having the consistence of a very thick honey or Venice turpentine.

Third method

The reaction mixture, without being freed from the alcohol and ammonia, is allowed drop by drop to enter a large excess of ether kept under continual stirring. The milky precipitate collects in the form of a doughy mass, partly on the surface of the walls and partly on the bottom of the vessel in which the precipitation is effected. After being freed from the almost clear mother liquor by decantation of the latter, the precipitate is collected and kneaded with fresh portions of ether until, on evaporation, the ether does not leave any residue, whereupon the residue is dried under reduced pressure at room temperature. The final product is a yellow mass having a consistence reminding one of Venice turpentine.

Fourth method

Either the crude reaction product, that is the product left as residue of the distillation of the alcohol and ammonia or the residue of the distillation of the unchanged α-dichlorohydrine (see first method) is dissolved in a small quantity of water, and the clear solution is cooled to 8° C. and precipitated while stirring with a solution of sodium carbonate of 20 per cent. strength. The oily precipitate settles on the bottom of the vessel in the form of a dense, turbid, oily layer. After having stood for several hours, the oily precipitate is separated from the mother liquor by decantation of the latter.

The final product is soluble in water, aqueous alcohol and in methyl alcohol and is dried in vacuo at room temperature.

The invention is not restricted to the proportions, and in some of the other examples of said case 618,800, instead of 1185 parts of the alcoholic ammonia solution, various amounts from 170 to 2720 parts thereof can be used.

The following example is also quoted from Ser. No. 618,800.

EXAMPLE B

The process is conducted as in Example A, but with the difference that, instead of 1185 parts of the alcoholic ammonia solution, 340 parts of the alcoholic ammonia solution are used.

There may be used equimolecular proportions of other unsubstituted di-halogen-hydrines of polyhydric alcohols, for example erythrite di-chlorohydrine or mannite dichlorhydrine. Instead of the chlorine compounds, the corresponding bromide or iodine compounds can be used.

Now in accordance with the present invention, I first form alkali cellulose, and act thereupon with one or more of the bodies above described and claimed in the said copending case 618,800,— namely I act upon this alkali cellulose with an organic body containing nitrogen, oxygen and halogen.

The product of such action is then xanthated, and the solution given the shape of the desired artificial structure, (e. g. thread) and treated with a coagulating bath, or with a coagulating and plasticizing bath (or baths) to produce the artificial structure desired.

I have further found that in many cases valuable products are obtained when one or more halogen derivates of di- or polyhydric alcohols, for example one or more halohydrins, or one or more halogen fatty acids as such or in the form of their salts, or one or more trithiocarbonic acid esters, for example trithiocarbonic ester of glycerine, or one or more alkylating agents, or one or more cyclic ethers, such as alkylene oxides, or one or more suitable reagents set forth in the list of my U. S. patent application Ser. No. 556,719, or one or more of the alkylating agents characteristic of my U. S. patent application Ser. No. 521,023, or one or more of the hydroxyalkylating agents characteristic of my U. S. patent application Ser. No. 521,018 are incorporated with the xanthates prepared according to the present invention, and the products thus obtained converted into artificial structures. The reagents mentioned in Ser. No. 556,719 include the following list, as typical:

Di-halogen paraffins, for example compounds of the type of ethylene chloride or tri-methylene chloride (1.3 dichloro-propane) (which may be regarded as halogen hydracid esters of di-hydric paraffin alcohols (glycols)), or of the type of methylene chloride (which may be regarded as neutral halogen hydracid esters of glycols with two hydroxyl groups attached to one and the same carbon atom).

Poly-halogen paraffins.

Halogen olefines (halogen substitution products of olefines).

Halogen derivatives of ethers of mono-hydric alcohols.

Halogen derivatives of aldehydes or ketones.

Sulphochlorides of tertiary amines, such as, for example the sulphochloride of dimethyl-aniline.

Halogen derivatives of higher fatty acids having at least 6 carbon atoms.

Halogen derivatives of olefine mono-carboxylic acids.

Halogen alkylamines or halogen aralkylamines. (This group now being covered in a divisional case.)

Halogen derivatives of oxy-acids, for example $\beta$-di-chloro-lactic acid or $\beta$-tri-chloro-lactic acid.

Halogen derivatives of keto-carboxylic acids.

Halogen derivatives of nitro-methane, such as chloro-picrin.

Urea halides, alkyl-urea halides, aralkyl-urea halides and aryl-urea halides.

Tri-thiocarbonic acid esters.

Halogen derivatives of cyanogen, such as cyanogen halides or cyanuric halides (tri-cyanogen halides).

Halogen derivatives of di-carboxylic acids, such as halogen succinic acid.

Organic acid esters and inorganic acid esters of di- or polyhydric alcohols, (other than halogen hydracid esters).

Some halogen derivatives of hydrocarbons of the type $C_nH_{2n+2}$, (for example tri-chlorohydrin 1:2:3-tri-chloropropane).

Sulphochlorides of hydrocarbons, such as ortho- or paratoluene sulphochloride, naphthalene sulpho-chloride.

Halogen derivatives of halogenated alkyl phenyl ethers, such as benzoylated chloro-anisol.

Acid esters of phenols, for example phenyl carbonate or phenyl-ethyl carbonate.

Acid halides, for example benzoyl halides, malonyl halides, di-ethyl malonyl halides.

Halogen derivatives of aromatic mono-carboxylic acids.

Halogen hydracid esters of phenyl glycols or phenyl glycerines or of their derivatives, for example ethers.

Phenyl alkylene oxides.

Phenyl-halogen-fatty acids, for example phenyl-chloro-acetic acid or phenyl-chloro-propionic acid.

Halogen derivatives of phenyl-paraffin-alcohol acids, for example phenyl-halogen-lactic acid or phenyl-halogen-oxy-propionic acid.

Phenyl-acetylene.

Halogen derivatives of olefine-benzols.

Halogen derivatives of phenyl-olefine alcohols or oxy-phenyl-olefine alcohols.

Halogen derivatives of pseudophenols, methylene quinones and quinols, for example ortho-oxy-mesityl chloride or piperonyl chloride.

Sulphochlorides of phenyl-mono-oxy-carboxylic acids, such as salicylic acid or cresotinic acid and chloro-or-nitro-substitution products thereof.

Halogen derivatives of condensed nuclei, for example $\alpha$-naphthalene-mono-halides or halogenated naphthalenes.

Halogen derivatives of hydro-naphthalene compounds, for example di-hydro-naphthalene-di-bromide or tetra-hydro-naphthalene-glycol-chlorohydrin.

Halogen derivatives of heterocyclic compounds having one nitrogen atom in the ring, for example halogen derivatives of pyridine or of its homologues, or halogen derivatives of quinoline or of its homologues, or halogen derivatives of iso-quinoline or of its homologues.

Sulphochlorides of heterocylic compounds which contain one nitrogen atom in the ring, for example quinoline or pyridine.

Among the alkylating agents mentioned in Ser. No. 521,023, dialkyl sulphates, alkyl halides, halogen fatty acids (e. g. chloracetic acid) and their salts, are important.

The reagents mentioned in 521,018 (now U. S. Patent 1,910,440) include cyclic ethers of polyhydric alcohols, such as glycide (epihydrine alcohol), butadiene dioxide. Cyclic ethers of di-, tri- and tetra-hydric alcohols also are suitable.

The present process may also be carried out in such a manner that, in addition to one or more reagents characteristic of the invention, (which will hereinafter be referred to for brevity as "distributed nitrogen-halogen-oxygen derivative") one or more halogen derivatives of di- or polyvalent alcohols, or one or more halogen fatty acids, or one or more trithiocarbonic acid esters, or one or more alkylating agents, or one or more cyclic ethers, such as alkylene oxides, or one or more reagents belonging to the types proposed in my U. S. patent application Ser. No. 556,719 are used in the preparation of the cellulose compound or derivative to be xanthated.

In so far as the reagent or reagents intended to be used for the preparation of the cellulosic body to be xanthated, in addition to one or more reagents characteristic of the invention, are or can be used as parent material for the preparation of the reagents characteristic of the present invention, this mixed use of the reagents characteristic of the present invention, on the one hand and of the additional reagents set forth in the preceding paragraph on the other, may be effected by conducting the preparation of the parent reagent in such a manner that it contains a small or large proportion of the reagent to be used in addition to one or more reagents characteristic of the invention and intended to be used in the preparation of the cellulosic body to be xanthated.

The said mixed use can, however, also be effected by simply employing one or more reagents characteristic of the invention and one or more halogen derivatives of di- or polyhydric alcohols, or one or more halogen fatty acids, or one or more trithiocarbonic acid esters, or one or more alkylating agents, or one or more cyclic ethers, such as alkylene oxides, or one or more reagents belonging to the types proposed in the U. S. patent application Ser. No. 556,719 either in the form of a previously made mixture (if they do not react with each other) or simultaneously, or consecutively in any desired order.

The process of making artificial structures from the new cellulose derivatives comprises bringing the xanthated product into the appropriate shape or form and acting upon it (a) with an agent that has a coagulating effect on the shaped material, or (b) first with an agent having the said coagulating effect and then with an agent that has a plasticizing effect on the freshly coagulated structure, or (c) with an agent that has both a coagulating effect and a plasticizing effect.

In the above coagulation step, any setting bath known in the viscose silk industry can be used as a coagulating bath, such as dilute sulphuric acid (e. g. a 10% solution of sulphuric acid in water) or a bath containing dilute sulphuric acid and neutral salts (such as sodium sulphate) or a solution of an acid salt such as sodium bisulphate. For giving the plasticizing effect, solutions can be used which contain 20 to 40% (and preferably not less than 45% of $H_2SO_4$) or an equivalent quantity of another mineral acid, or other baths as described in my earlier cases 435,649 or 556,719 or 597,640. But the present invention is not restricted to the use of particular coagulating agents or particular plasticizing agents.

Since the practice of the process is exactly as set forth in the U. S. patent application Ser. No. 556,719 and explained therein by the aid of numerous examples, it appears superfluous to repeat here all particulars relating to the carrying out of the present process under various working conditions and to give here examples demonstrating all possible modifications of working the present invention. In conjunction with the detailed description and the examples of U. S. patent application Ser. No. 556,719, the following examples appear to be sufficient to illustrate the practical execution of the invention which, however, is by no means limited to these examples. The parts are by weight:—

*Example 1*

1,000 parts of wood-pulp or cotton linters are steeped in 20,000 parts of caustic soda solution of 18 per cent. strength at 15° C., and the reaction mass is allowed to stand for 3 hours at room temperature. After this time, the excess of the caustic soda solution is removed by pressing the alkali cellulose, for example until it weighs 3,000 to 4,000 parts, and the pressed alkali cellulose is comminuted in a shredder for about 3 hours at 12 to 15° C. Then to the alkali cellulose is added 100 parts of the product of Example A, given above, which has been purified according to the first method, as given after that example.

The reaction mass is now, or after having stood for 24 to 48 hours at room temperature, placed in a filter press or on a straining cloth, and washed with water until free from alkali, whereupon the excess of water is pressed out and the water content of the pressed product determined by drying a sample at 100° C.

The pressed mass is now well mixed with such an amount of water and caustic soda as, together with the water present in the mass, to contain 20,000 parts of caustic soda solution of 18 per cent. strength.

The reaction mixture is now allowed to remain at room temperature for 3 hours, after which it is pressed down to 3,000 to 4,000 parts and comminuted in a shredder for 3 hours at 12 to 15° C. Immediately after shredding, the reaction mass is placed in a closed vessel, preferably capable of being agitated, whereupon 600 parts of carbon bisulphide are added and allowed to act for 6 to 10 hours at 18 to 20° C. The excess carbon bisulphide is now blown off during 15 minutes, and the xanthated mass dissolved in so much water and caustic soda, as to yield a solution which contains about 5 to 7 per cent. of the dry residue (determined before the xanthating step by drying a sample of the washed and pressed product) and 8 per cent. of caustic soda. Before being spun, the solution is allowed to ripen for 48 to 96 hours at 15° C. during which time it is filtered 3 to 4 times through cotton. The solution is then spun into a bath containing 40 to 75 per cent. of sulphuric acid monohydrate in the manner described in the examples of my U. S. Reissue Patent 18,170.

If desired, before entering the bath containing 40 to 75 per cent. of $H_2SO_4$, the thread-like stream of the xanthate solution may be conducted through any setting bath that has only a coagulating, but no plasticizing effect on the freshly coagulated thread, for example in the manner described in Example X of said reissue patent.

In the foregoing example, before being brought into contact with the product of Example A, given above, the alkali cellulose may be matured, for instance for 24 to 72 hours at 15 to 20° C.

Also the alkali compound of the washed and pressed product, produced by bringing together the alkali cellulose with the product of Example A, given above may, before being treated with the carbon bisulphide, be allowed to mature for, say, 24 to 72 hours at 15 to 20° C.

In the foregoing example, the xanthated mass may alternatively be dissolved in such an amount of water and caustic soda, as to yield a solution which contains about 5 to 7 per cent. (and, if a cellulose having a high viscosity is employed as primary material, 3 to 5 per cent.) of the dry residue determined in the washed and pressed product before the xanthating step, and 5 per cent. of caustic soda.

Example 2

The process is conducted as in Example 1, but with the difference that, instead of 100 parts of the product of Example A, purified by the first method given in said example, 200 to 300 parts of this product, purified according to the second method given in that example, are used.

Example 3

The process is conducted as in Example 1 or 2, but with the difference that, instead of the product of Example A, quoted above, the product of Example B, quoted above, purified according to the second method given in Example A, is used.

Example 4

The process is conducted as in any one of the Examples 1 to 3, but with the difference that, in addition to 5 to 10 parts of the product of Example A, quoted above, purified according to the first method of that example, or 10 to 20 parts of the product of Example A, quoted above, purified according to the second method given in that example, also 75 parts of a sulphur-halogen substitution product of a polyhydric alcohol, are allowed to act on the alkali cellulose. This latter substitution product can be made by reacting on a dihalogenhydrine, say alpha or beta dichlorohydrine of glycerine, with an amount of sodium sulphide or sodium hydrosulphide, which is less than stoichiometric equivalent of the chlorine content of the dichlorohydrine. This is claimed in my copending application 597,641.

Example 5

The process is conducted as in any one of the preceding examples, but with the difference that 10 to 20 parts of α-dichlorohydrin or α-monochlorohydrin or ethylene chlorohydrin are added to the fresh solution of the xanthate.

Example 6

The process is conducted as in any one of the Examples 1 to 3, but with the difference that 10 to 20 parts of ethylene oxide or of di-methyl sulphate or of di-ethyl sulphate or of sodium monochlor-acetate, or of trithiocarbonic acid ester of glycerine are added to the fresh solution of the xanthate.

Example 7

The process is conducted as in any one of the Examples 1 to 3, but with the difference that 10 to 20 parts of ethylene chloride, or of glycerophosphoric acid, or of diacetin, or of benzoyl chloride, or of p-toluene-sulpho-chloride, or of benzyl-glycol-chloro-hydrin, or of 1:2-dichlorether, or of chloracetone, or of β-chlorpropylamine hydrochloride, are added to the fresh solution of the xanthate.

Example 8

The process is conducted as in any one of the preceding examples, but with the difference that in addition to the nitrogen bodies (Examples 1 to 3), 10 to 30 parts of α-monochlorohydrin, or of ethylene chlorohydrin, or of ethylene oxide, or of sodium monochloracetate, or of trithiocarbonic acid ester of glycerine, or of dimethyl sulphate, or of di-ethyl sulphate, or of ethylene chloride, or of glycero-phosphoric acid, or of diacetin, or of benzoyl chloride, or of p-toluene-sulpho-chloride, or of benzyl-glycol-chlorohydrin, or of 1:2-dichlorether, or of chloracetone, or of o-chloronitro-benzene are contacted with the alkali cellulose.

Example 9

The process is conducted as in Examples 1 to 3, but with the difference that 10 to 20 parts of a product prepared according to the above quoted Example A or B, or the modifications thereof as stated above, are added to the fresh solution of the xanthate.

In place of the product of my copending case 618,800, I can (when desired) use in the above examples, the other substances as given in my copending case 618,801, now Patent 2,051,051, (see top of second column of page 11) namely I can use equivalent quantities of any of the following:—2-chloro-2-nitro-propanol-(1), or 2-bromo-2-nitro-propanol-(1), 1-bromo-1-nitro-propanol-(2), 3:3:3-trichloro-1-nitro-propanol, acet-imido-β-chloro-ethyl ether, dibromo-acetic acid dimethyl-amide, N-methyl-N-chloro-acetyl-urea, dichloro-acetic acid ethyl-amide, oxalic acid ethyl ester-[β-bromo-ethyl-amide], N-[β,γ-dibromo-propyl]-urea, acetic acid [β,γ-dibromo-propyl-amide], trimethyl-[iodoxy-propyl]-ammonium hydroxide, chlor-acetyl-amino-acetic acid ethyl ester, chloracetyl-diglycine-amide, α-β-dibromo-propionyl-amino acetic acid, β-chlor-α-amino-propionic acid, 2-acetamino-benzyl chloride, chlor-allyl-phenyl-urea $(C_6H_5.NH.CO.NH.CH_2.CCl:CH_2)$,

[2-bromo-methyl-benzyl]-o-anisidine, 2-[γ-chlor-β-oxy-propylamino]-benzyl alcohol, 1² or 1³-chlor-5-amino-4-oxy-3-methoxy-1-propyl-benzene, chloropropyl-ethoxy-phenyl-urea $(CH_3 \cdot CHCl \cdot CH_2 \cdot NH \cdot CO \cdot NH \cdot C_6H_4 \cdot O \cdot C_2H_3)$, and the like.

The expressions "viscose", "artificial structures", "artificial threads", "coagulating agents", "plasticizing agents" used in this specification have the same meaning as they have in my U. S. patent applications Ser. Nos. 597,640 and 618,801.

The expression "one or more reagents of the types proposed in my U. S. application Ser. No. 597,640" is not intended to include chloro-substitution products of phenyl-mono-oxy-carboxylic acids, such as salicylic acid or cresotinic acid which are referred to in my prior U. S. application Ser. No. 556,719.

The statement in the claims that the substituents are attached to an aliphatic chain is not intended to imply that the compound in which the substitution is effected consists solely of said aliphatic chain, or that it necessarily contains rings. The substituents are attached to carbon atoms of an aliphatic chain and not to the carbon atoms of an aromatic nucleus.

What I claim is:—

1. A process of making shaped artificial structures which comprises reacting on cellulose in the presence of an alkali, with a polyvalent organic compound which contains nitrogen attached to at least one carbon atom in a polyvalent aliphatic nucleus in said organic compound, and which substitution product contains a halogen atom attached to at least one carbon atom of said nucleus and an oxygen atom attached to at least one carbon atom of said nucleus, thereafter xanthating the reaction product and dissolving the xanthate.

2. Process as in claim 1, wherein the oxygen atom is a part of the hydroxyl group.

3. A process as in claim 1, wherein the nitrogen atom links hydrogen to a carbon atom.

4. Process as in claim 1, in which the said three substituents named are attached to three different carbon atoms.

5. In the manufacture of artificial structures, the herein described step which comprises reacting on cellulose in the presence of an alkali, with an organic body containing nitrogen, oxygen and a halogen atom, each attached to a carbon atom of the organic nucleus, and of which three substituents not more than two are attached to the same carbon atom.

6. In the manufacture of artificial structures, the herein described step which comprises reacting on cellulose in the presence of an alkali, with an organic body containing nitrogen, oxygen and a halogen atom, each attached to a different carbon atom in said organic body.

7. Process as in claim 5, in which the nitrogen is in an amino group.

8. Process as in claim 5, in which the oxygen is in a hydroxyl group.

9. Process as in claim 5, in which the halogen atom is a chlorine atom.

10. A process as in claim 5, in which the nitrogen is in a nitrogen-hydrogen group, the oxygen is in a hydroxyl group and the halogen atom is a chlorine atom.

11. Process as in claim 1, in which other reactive compounds of a polyvalent organic radical are added before the xanthating step.

12. Process as in claim 1, in which reactive compounds of a polyvalent organic radical are added after the xanthation.

13. Process as in claim 1, in which other reactive compounds capable of reacting on cellulose in the presence of a base are added before the xanthating step.

14. Process as in claim 1, in which an organic compound capable of reacting on cellulose in the presence of alkali, is added after the xanthation and dissolving steps.

15. A process of making a xanthate of a cellulosic compound, which comprises reacting upon cellulose in the presence of an alkali, with a substitution product of a polyhydric alcohol, which substitution product contains nitrogen attached to a carbon atom of the nucleus of said polyhydric alcohol, and contains a halogen atom attached to a carbon atom of the nucleus of said polyhydric alcohol, and xanthating the product.

16. In the process of producing shaped artificial structures, the improvement which comprises reacting upon cellulose in the presence of an alkali, with a substitution product of a polyhydric alcohol containing at least one nitrogen atom attached to carbon in a polyvalent aliphatic nucleus, and which substitution product contains at least one halogen atom attached to carbon in said nucleus, and at least one oxygen atom attached to carbon in said nucleus, thereafter xanthating the reaction product and dissolving the xanthate.

17. In the manufacture of shaped artificial structures, the herein described improvement which comprises reacting on cellulose in the presence of an alkali, with an organic body containing nitrogen, oxygen and a halogen atom, each attached to a carbon atom of the organic nucleus, and not more than two of said substituents being attached to the same carbon atom, and xanthating the product.

18. In the manufacture of shaped artificial structures, the herein described improvement which comprises reacting on cellulose in the presence of an alkali, with an organic body containing nitrogen, oxygen and halogen, each attached to a different carbon atom in said body, and xanthating the cellulosic body produced by such action.

19. A process of making shaped artificial structures by coagulating a shaped solution of a xanthate of a cellulosic body introduced in known way into a coagulating bath, which process comprises so introducing as the initial xanthate solution, a solution of a xanthate of a product of the action upon alkali cellulose, of a glycerine derivative which contains nitrogen attached to at least one carbon atom, halogen attached to another carbon atom and a hydroxyl group attached to a third carbon atom.

20. A process of making shaped artificial structures by coagulating and plasticizing a shaped solution of a xanthate of a cellulosic body, which process comprises using as initial xanthate in a regeneration and plasticizing process applicable to viscose, a xanthate of a product which forms when cellulose in the presence of an alkali is acted upon with a glycerine derivative which contains nitrogen attached to at least one carbon atom, halogen attached so another carbon atom and a hydroxyl group attached to a third carbon atom.

21. In the manufacture of shaped artificial structures, the herein described improvement which comprises reacting on cellulose in the presence of an alkali, with a glycerine derivative containing nitrogen, oxygen and a halogen atom, each attached to a carbon atom of the glycerine nucleus, and not more than two of said substituents being attached to the same carbon atom and xanthating the product.

22. In the manufacture of shaped artificial structures, the herein described improvement which comprises reacting on cellulose in the presence of an alkali, with an organic body which is a glycerine derivative containing nitrogen, oxygen and halogen, each attached to a different carbon atom in said body, and xanthating the cellulosic body produced by such action.

LEON LILIENFELD.